United States Patent [19]
Höfle

[11] Patent Number: 5,667,328
[45] Date of Patent: Sep. 16, 1997

[54] ATTACHMENT MEMBER

[75] Inventor: Siegfried Höfle, Götzis, Austria

[73] Assignee: Hi Hi Aktiengesellschaft

[21] Appl. No.: 569,931

[22] Filed: Dec. 8, 1995

[30] Foreign Application Priority Data

Dec. 16, 1994 [DE] Germany .................. 44 44 908.9

[51] Int. Cl.[6] .................................................. F16B 9/00
[52] U.S. Cl. ................... 403/282; 403/274; 403/242; 411/180
[58] Field of Search ................. 403/279, 280, 403/281, 282, 285, 274, 277, 242; 411/180, 181, 183, 427, 429; 29/512

[56] References Cited

U.S. PATENT DOCUMENTS

| | | | |
|---|---|---|---|
| 924,398 | 6/1909 | Stevens | 411/183 X |
| 1,502,399 | 7/1924 | Renner | 411/181 X |
| 1,872,385 | 8/1932 | Andrew | 411/180 |
| 2,302,501 | 11/1942 | Mears . | |
| 2,771,262 | 11/1956 | Laystom . | |
| 3,014,609 | 12/1961 | Hobbs | 411/180 X |
| 3,526,420 | 9/1970 | Brancaleone | 403/282 |
| 3,544,143 | 12/1970 | Ohlsson | 403/274 X |
| 3,960,047 | 6/1976 | Liffick . | |
| 4,652,169 | 3/1987 | Matthews | 403/282 X |
| 5,251,370 | 10/1993 | Muller et al. | 403/235 X |

FOREIGN PATENT DOCUMENTS

| | | | |
|---|---|---|---|
| 3905688 | 8/1990 | European Pat. Off. . | |
| 17231 | 7/1899 | United Kingdom | 403/282 |
| 665544 | 1/1952 | United Kingdom | 411/427 |

*Primary Examiner*—Harry C. Kim
*Attorney, Agent, or Firm*—Anderson Kill & Olick P.C.

[57] ABSTRACT

An attachment member is formed of a connecting part (31) and a deformed plate part (31a) in the form of a pipe clamp for securing pipe lines to a structural component. The pipe clamp has a throughbore (33) surrounded by an annular collar (37). A contact surface (35) formed by a mechanically worked attachment section (36) has an annular shaped recess (38) for receiving the collar (37).

7 Claims, 3 Drawing Sheets

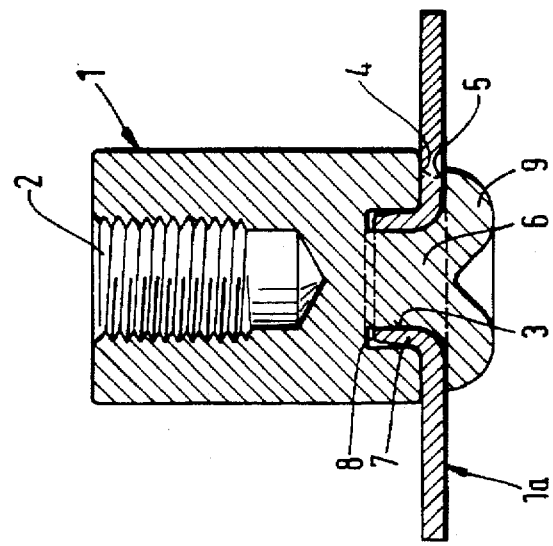
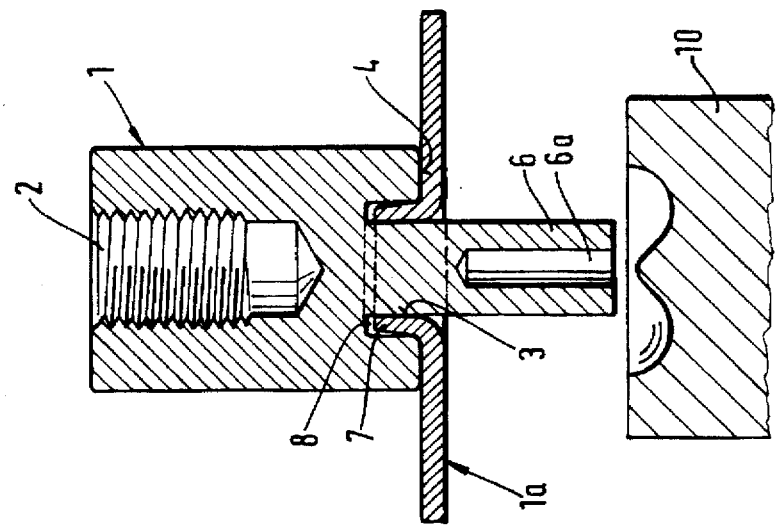
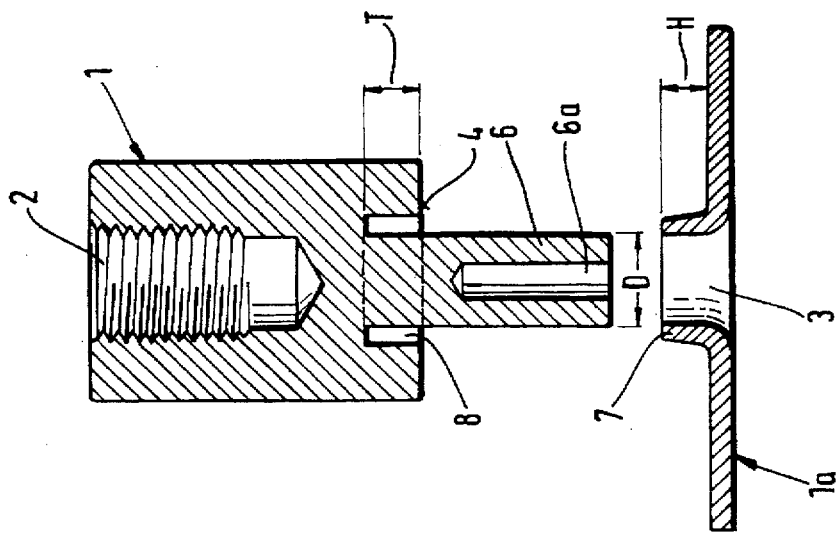

ATTACHMENT MEMBER

BACKGROUND OF THE INVENTION

The present invention is directed to an attachment member formed of a deformed plate part and a connecting part. The deformed plate part has a throughbore for receiving the connecting part and the connecting part has a first bearing surface abutting the plate part as well as a second bearing surface located opposite the first bearing surface and extending through the throughbore.

An attachment member with a connecting part and a deformed plate part for attaching pipe clamps to structural components is known in DE-AS-1 262 699. A bolt with two threaded regions, which can be connected to a structural component, serves as a connecting part with a first threaded region in connection with the structural component and a second threaded region can be connected with the deformed plate part. The engagement of the connecting part with the deformed plate part is achieved by a throughbore in the deformed plate part and a collar with an internal thread formed in the circumferential region of the throughbore. It is impossible to hang pipe clamps supporting heavy pipes using this known attachment member. High tensile forces result in a radial strain on the collar, so that the threaded connection between the connecting part and the deformed plate part is destroyed.

A hanging device for securing objects to structural parts is known in DE-PS 16 50 945, wherein an attachment member with a deformed plate part and a connecting part serves for fixing two profiled rods adjustable relatively to one another in a stepless manner. The connecting part, secured nondetachably with the deformed plate part, has an engagement means in the form of an internal thread and a cylindrical attachment, which penetrates a throughbore of the deformed plate part while abutting at a first contact surface of the connecting part on the internal side of the deformed plate part. The end region of the attachment is radially widened by mechanically working the material and forms a second bearing surface abutting at the outer side of the deformed plate part located opposite the first bearing surface. High tensile forces applied to the first or second contact surfaces of the connecting part cause a widening of the throughbore, so that the connecting part can be pulled out of the deformed plate part.

SUMMARY OF THE INVENTION

Therefore, the primary object of the present invention is to provide a deformed plate part with an extension where a secure engagement between the connecting part and the deformed plate part is assured even with the development of high tensile forces.

In accordance with the present invention, a circumferential collar is provided around the throughbore in the deformed plate part, with the collar projecting on one side from the plane or surface on one side of the plate part and a recess is provided in one of the contact surfaces in the form of an annular recess for receiving the collar with the depth of the annular recess corresponding at least to the height of the collar.

Due to the arrangement of the attachment member embodying the invention, high tensile forces can be carried. Lateral and bending forces in the region of the throughbore, mainly due to tensile forces, are carried by the collar located in the circumferential region of the throughbore. This collar, extending into an annular shaped recess in one of the two bearing surfaces, imparts a high stability to the deformed plate part in the region of the throughbore. Radial widening of the throughbore is prevented by the positively locked engagement of the collar in the annular shaped recess.

For manufacturing reasons, the annular shaped recess for the collar is located in the first contact surface. The annular recess in the connecting part can be formed before attachment section on the attachment part is placed in connection with the deformed plate part. The attachment section having a cylindrical outside surface can be securely clamped in a machine tool.

It is preferable to shape the attachment section as an integral part of the connecting part. The second bearing surface is formed by a portion of the attachment section which is deformed in the radial direction by a riveting tool engaging the end of the attachment section.

For reasons of handling and assembly, the attachment section is detachably engaged with the connecting part. The entire connecting part thus is formed of two parts which can be connected rapidly to the deformed plate part.

A detachable connection of the connecting part with the deformed plate part is achieved, if the attachment section has an external thread cooperating with an internal thread in the connecting part.

Fastening the attachment member to a structural part is attained by engagement means on the connecting part, preferably formed as a thread, where the connecting part thread serves as a junction with a threaded rod connected with the structural part.

To place the attachment member in connection with threaded rods having different sized threads, the connecting part thread is preferably formed of at least two internal threads each with a different diameter. The internal threads are arranged coaxially and consecutively.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

In the drawings:

FIGS. 1, 2, 3 are axially extending cross sectional views of an attachment member embodying the present invention formed of a deformed plate part and a connecting part and showing the parts in different steps of assembly;

DETAILED DESCRIPTION OF THE INVENTION

Figure 4:
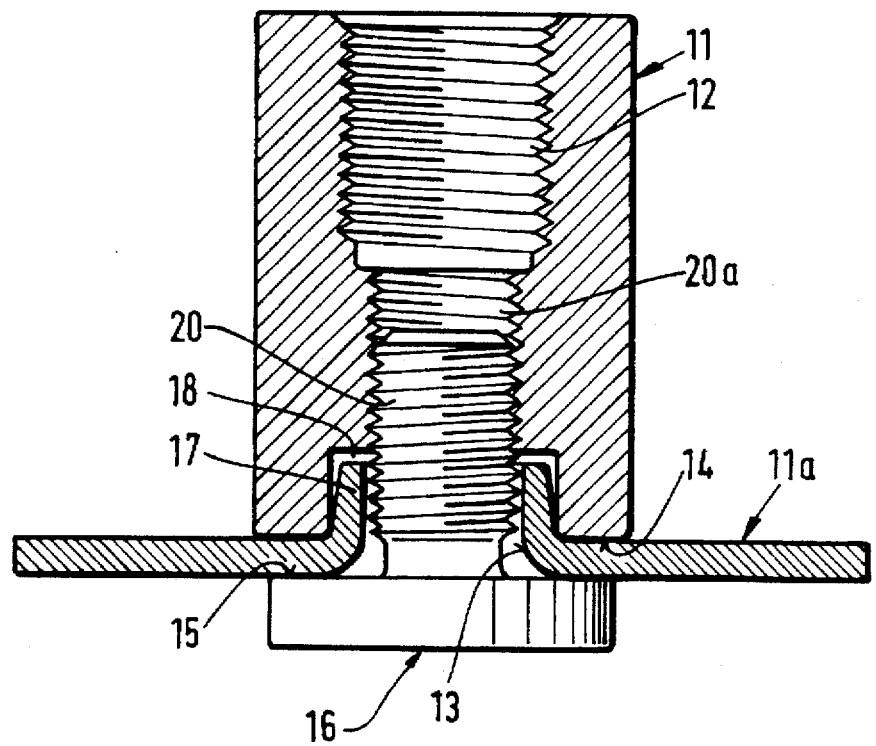
FIG. 4 is a axially extending cross sectional view of another attachment member embodying the present invention with a two piece connecting part.

In FIGS. 1, 2 and 3 three steps in the assembly of an attachment member are shown where the attachment member is made up of a connecting part 1 and a bent or deformed plate part 1a.

In FIG. 1, the attachment member is shown with the connecting part 1 and the deformed plate 1a in position to be assembled. Plate part 1a has an axially extending throughbore 3 enclosed on one side of the deformed plate part by a circumferentially extending collar 7. The collar 7 projects from the plane of the plate part 1a on the side facing the upper connecting part 1. Connecting part 1 has an axially extending attachment section 6 having a diameter D and a cross sectional shape corresponding the cross sectional shape of the throughbore 3 in the deformed plate part 1a. The transverse cross section of the attachment section 6 is smaller than the remaining transverse cross section of the connecting part 1. Attachment section 6 has a blind bore 6a extending axially inwardly from its lower end, as viewed in FIG. 1, and the bore affords an improved spreading or expansion of the attachment section 6 in the radial direction.

A first contact surface 4 of the connecting part 1 faces the deformed plate part 1a and extends perpendicularly to the axial direction of the connecting part 1 and has an annular shaped recess 8 for receiving the collar 7 of the deformed plate part 1a. The depth T of the recess 8 is at least as great as the height H of the collar 7, note FIG. 1. The collar 7 projects from the upper surface of the deformed plate part 1a by the height H. The recess 8 in the connecting part 1 is located radially outwardly from the attachment section 6.

The opposite end of the connecting part 1 from the attachment section 6 has engagement means 2 in the form of an axially extending internal thread. This internal thread serves for receiving a threaded rod, not shown, which is solidly connected to a structural component, also not shown.

In FIG. 2 the connecting part 1 is inserted through the throughbore 3 in the deformed plate part 1a. A riveting tool 10 is located opposite the lower end of the attachment section 6, as viewed in FIG. 2, and the riveting tool has a profiled surface in its side facing the attachment section 6.

As can be seen in FIG. 3, a portion of the attachment section 6 has been deformed by the riveting tool into a rivet head 9, with the rivet head 9 gripping the lower surface of the deformed plate part 1a. Accordingly, the region of the rivet head 9 facing the plate part 1a forms the second contact surface 5.

In FIG. 4 another attachment member is shown with a connecting part 11 detachably connected to an attachment section 16 extending through a throughbore 13 in a deformed plate part 11a. The deformed plate part 11a is similar to the deformed part 1a shown in FIGS. 1, 2 and 3. A first contact surface 14 is formed on the connecting part 11 and a second contact surface 15 is formed on the attachment section 16 with the two contact surfaces each located on an opposite side of the deformed plate part 11a.

An annular shaped recess 18 is located in the first contact surface 14 and is arranged to receive a collar 17 on the deformed plate part 11a. The collar 17 encircles the throughbore 13 formed in the plate part 11a. An internal thread 20a is formed in the connecting part 11 and serves to receive an external thread 20 on the attachment section 16. The internal thread 20a is located inwardly from the recess 18 in the lower end of the connecting part 11.

The second contact surface 15 is formed by a widened region of the attachment section 16 projecting radially outwardly beyond the diameter of the throughbore 13.

Arranged coaxially with the internal thread 20a in the upper end of the connecting part 11 is an engagement means 12 in the form of an internal thread serving to fasten the attachment member to a structural component. The internal thread formed by the engagement means 12 has a larger diameter than the internal thread 20a.

The deformed plate part 11a and the connecting part 11 can be turned relative to one another by tools. Surfaces, not shown, serve for engaging the tools at the deformed plate part 11a and the connecting part 11.

Figure 5:
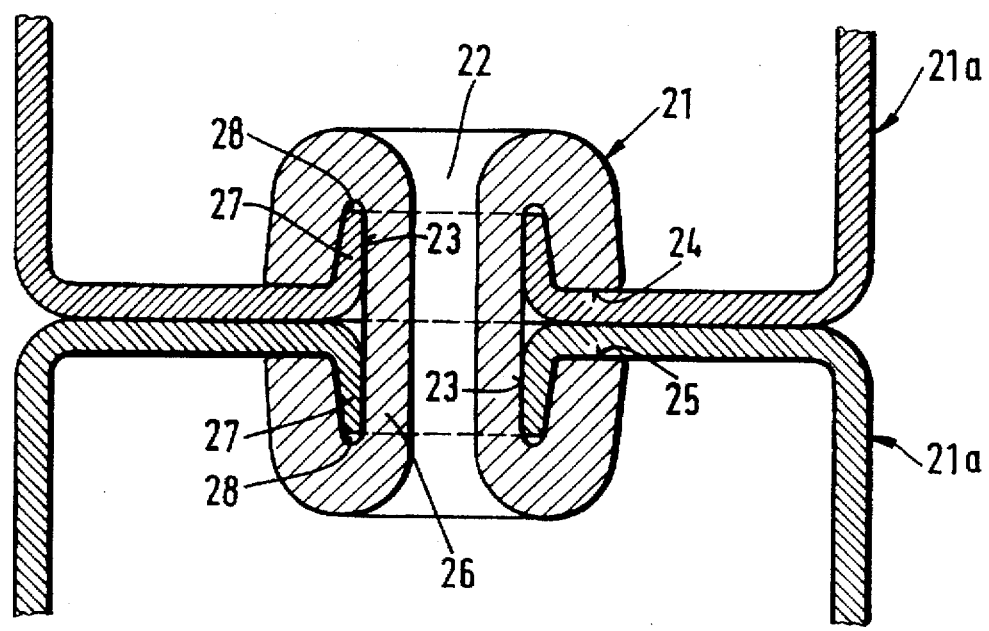
FIG. 5 is a axially extending sectional view of a further attachment member embodying the present invention with a connecting part securing two deformed plate parts together.

In FIG. 5 a single piece connecting part 21 serves to join two deformed plate parts 21a shaped as profiled rails. Each profiled rail has at least one throughbore 23 encircled by a circumferential collar 27. The collars 27 are arranged so that they project axially inside the profiled rails. The connecting part 21 is shaped to be symmetrical as viewed in cross-section. The connecting part 21 has a first contact surface 24 and a second contact surface 25 with an annular recess 28 formed radially inwardly of the contact surfaces. The recesses 28 are arranged to receive the collars 27 on the profiled rails 21a. The end of the connecting part 21 forming the second contact surface 25 can be deformed into the shape shown in the drawing by working a part of the attachment section 26.

As shown in FIG. 5, a central bore extends through the part 21 in the axial direction and serves as an engagement means 22 for the attachment member. The central bore serves for receiving a connecting member secured to a structural component, not shown.

Figure 6:
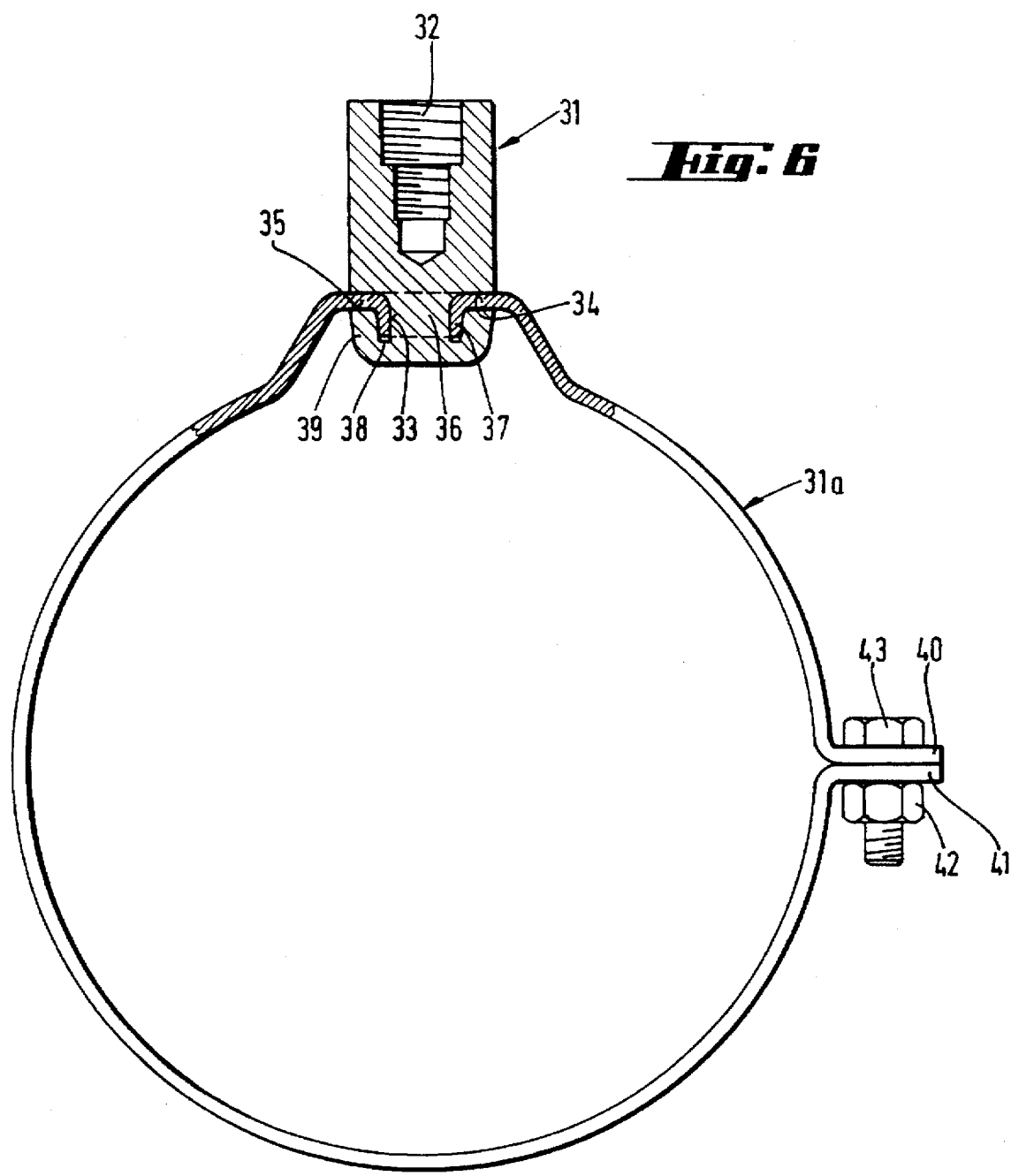
FIG. 6 is elevational view, partly in section, of yet another attachment member embodying the present invention with the deformed plate part and the connecting part forming a pipe clamp.

In FIG. 6 an attachment member is shown with a connecting part 31 and a deformed plate part 31a forming a pipe clamp. The pipe clamp has two flanges 40, 41 extending parallel to one another and penetrated by a connecting bolt 43 for securing the flanges together. A connecting nut 42 cooperates with the attachment bolt 43.

Connecting part 31 serves to secure the pipe clamp to a structural part, not shown, with the connecting part 31 being nondetachably connected to the pipe clamp. An attachment section 36 of the connecting part 31 projects through a throughbore 33 extending perpendicularly or radially to the inside cross section of the pipe clamp and a portion of the attachment section 36 has been deformed into a rivet head 39. Rivet head 39 forms a second contact surface 35 bearing against the inside of the pipe clamp in the region of the throughbore 35.

Throughbore 33 is laterally enclosed by a circumferentially extending collar 37 on the deformed plate part 31a or pipe clamp with the collar projecting inwardly into the interior of the pipe clamp. Radially inwardly from the second contact surface 35, the attachment section 36 forms an annular recess 38 for receiving the collar 37. The region of the pipe clamp around the throughbore 35 widens outwardly in the radial direction, so that neither the collar 37 nor the rivet head 39 projects into the interior cross-section of the pipe clamp.

The connecting part 31 has a first contact surface 34 bearing on the external surface of the pipe clamp in the region of the throughbore 33. The connecting part 31 has an engagement means 32 in the form of two coaxially, consecutively disposed internal threads in a blind bore extending inwardly from the end of the connecting part opposite the attachment section 36. These internal threads serve for receiving a threaded rod connected with a structural part, not shown.

While specific embodiments of the invention have been shown and described in detail to illustrate the inventive principles, it will be understood that the invention may be embodied otherwise without departing from such principles.

What is claimed is:

1. Attachment member comprises a deformed plate part (1a, 11a, 21a, 31a) and a connecting part (1, 11, 21, 31), said deformed plate part has an axially extending throughbore (3, 13, 23, 33) having an axis and arranged to receive said connecting part (1, 11, 21, 31), said connecting part (1, 11, 21, 31) having a planar first contact surface (4, 14, 24, 34) abutting a planar third contact surface on said deformed plate part and an attachment section (6, 16, 26, 36) extending through said throughbore (3, 13, 23, 33) and a second contact surface (5, 15, 25, 35) on said connecting part located opposite said first contact surface, said deformed plate part having a circumferential collar (7, 17, 27, 37) encircling said throughbore and projecting perpendicularly from the third contact surface of said deformed plate part, said collar having a height (H) extending from said third contact surface generally parallel to the axis of said throughbore, and one of said first and second contact surfaces having an annularly shaped recess extending parallel to the axis of said throughbore and having a base extending transversely of the axis of said throughbore for receiving said collar, said recess having a depth (T) extending parallel to the axis of said throughbore between the one of said first and second contact surfaces and the base of said recess and the depth (T) corresponds at least to the height (H) of said collar.

2. Attachment member, as set forth in claim 1, wherein said annularly shaped (8, 18, 28) receiving the collar (7, 17, 27) is formed in the first contact surface (4, 14, 24).

3. Attachment member, as set forth in claim 1, or 2, wherein said attachment section (6, 26, 36) is formed monolithically with said connecting part (1, 21, 31).

4. Attachment member, as set forth in claim 1, or 2, wherein said attachment section (16) is detachably secured to said connecting part (11).

5. Attachment member, as set forth in claim 4, wherein said attachment section (16) comprises an external thread (20) engageable with an internal thread (20a) in said connecting part (11).

6. Attachment member, as set forth in claim 1, or 2, wherein said connecting part (1, 11, 31) having an engagement means (2, 12, 32) therein, and said engagement means comprises an axially extending thread.

7. Attachment member, as set forth in claim 6, wherein said thread forming said engagement means (2, 12, 32) comprises at least two consecutively arranged internal threads each with a different diameter and arranged one following the other.

* * * * *

UNITED STATES PATENT AND TRADEMARK OFFICE
CERTIFICATE OF CORRECTION

PATENT NO. : 5,667,328
DATED : September 16, 1997
INVENTOR(S) : Siegfried Höfle

It is certified that error appears in the above-identified patent and that said Letters Patent is hereby corrected as shown below:

On the title page, item [73], change "Hi Hi" to --Hilti--.

Signed and Sealed this

Twenty-fifth Day of November, 1997

Attest:

BRUCE LEHMAN

Attesting Officer

Commissioner of Patents and Trademarks